May 31, 1960
J. R. BOYD ET AL
2,938,332
THERMAL JET ENGINE
Filed Feb. 20, 1956
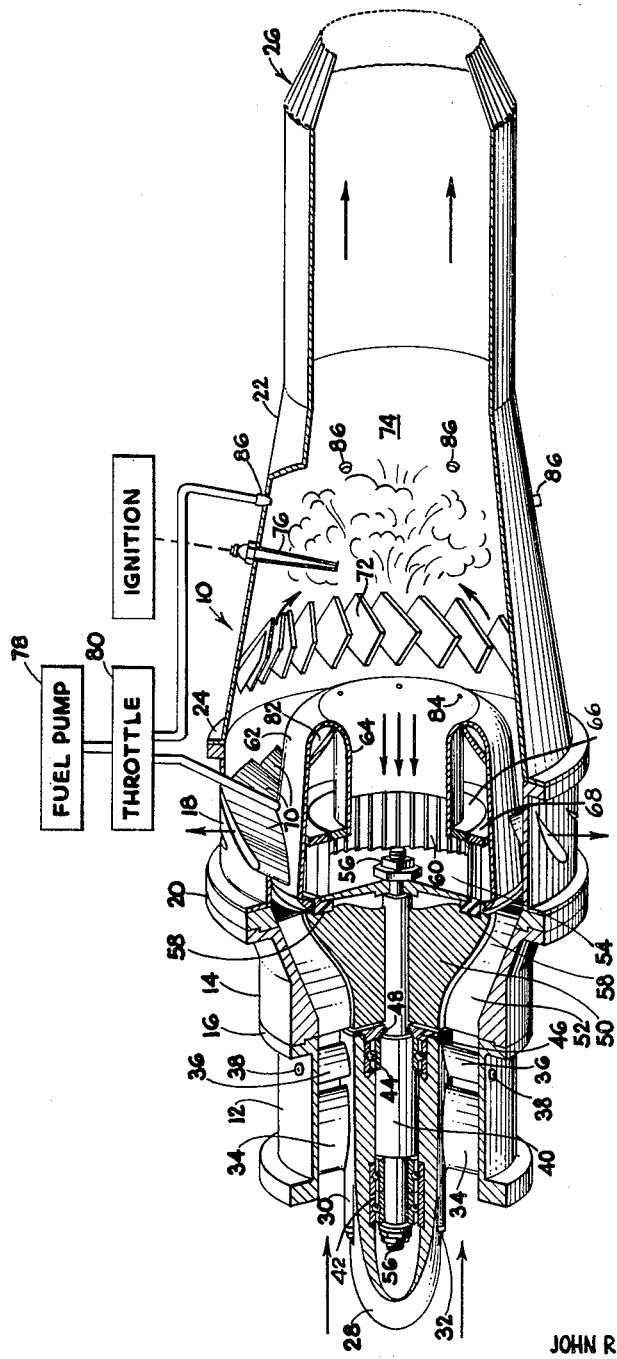
INVENTORS:
JOHN R. BOYD & ARNOLD L. HANES
BY *Elliott & Pastoriza*
ATTORNEYS

United States Patent Office 2,938,332
Patented May 31, 1960

2,938,332

THERMAL JET ENGINE

John R. Boyd, 2421 W. Washington Blvd., Venice, Calif., and Arnold L. Hanes, 2530 Colby Ave., Los Angeles 64, Calif.

Filed Feb. 20, 1956, Ser. No. 566,516

8 Claims. (Cl. 60—35.6)

This invention relates to a thermal jet engine and more specifically to a gas turbine type of jet engine particularly adaptable for aircraft propulsion.

Although the gas turbine type of jet engine has in recent years effectively superseded the propeller unit for most high speed aircraft applications, the jet engine in its conventional design is not practicably adaptable to lighter planes operating in the lower speed ranges. In addition, the present day jet engine has certain inherent limitations as a consequence of the necessity of maintaining a low weight to power ratio and at the same time achieving a maximum efficiency.

In this regard, the conventional jet engine, which in one form embodies a straight-through combustion system, must have added length in order to provide the necessary volume requirements for combustion, assuming a given diameter. In an alternative construction, using the return-flow combustion system, shorter length is possible, but another disadvantage results from frictional and corresponding pressure losses as a consequence of bends which must be provided to reverse the flow 180°. Thus, with either system there are design deterrents towards obtaining a maximum combustion space with a minimum amount of frictional losses and related pressure drop.

Another difficulty in the design of present day jet engines results from the fact that the usual flow path employed necessitates that all the high temperature gaseous products of combustion pass through the turbine blading, whereby the power developed by the jet engine is dependent to a great extent upon metallurgical progress made in overcoming high temperature deterioration problems. Thus, in conventional units, before higher turbine temperatures and resultant power increases may be effected, higher temperature metals or equivalent materials must be found.

It is, therefore, an object of the present invention to provide a jet engine of the gas turbine type adaptable for aircraft propulsion, which is designed to operate over a significantly larger velocity range than present day turbines while still maintaining a low weight to power ratio.

Another object of the present invention is to provide such a jet engine with relatively small over all dimensions, and yet which is characterized by a design which permits a large cross sectional area and volume to be available for combustion, with the consequence of no appreciable pressure loss therein.

Another object of the present invention is to provide a design for a thermal jet engine of the gas turbine type in which the thrust available for propulsion is only partially limited by the gaseous temperatures to which the turbine blading is subjected.

A further object of the present invention is to provide a jet engine in accordance with the foregoing objects, which is susceptible of economical manufacture with conventional materials while complying with the essential requirements and demands of aircraft propulsion units.

A still further object of the present invention is to provide a gas turbine type of jet engine in which a design is employed whereby a high maximum pressure region is attained in the area where heat energy release or combustion takes place, thereby enabling a corresponding maximum thermal efficiency.

These and other objects of the present invention are generally attained by providing a gas turbine type of jet engine comprising in combination a shaft to which is coupled a compressor and a turbine. Preferably, the compressor is of the centrifugal type and may include one or more impellers. The compressor and turbine units are disposed within a casing including a tail section in which combustion or energy release takes place.

An important feature of the invention resides in the provision of inner walls and guiding means secured within the casing and adapted to direct a part of the flow of air from the compressor radially inward towards a central portion of the tail section in such a manner as to create a high pressure region where combustion occurs and to additionally reverse the direction of flow 180° before the gas has entered the turbine.

To accommodate such reverse flow, a radial flow type turbine is preferably employed and has extending from its rim portion a plurality of exhaust tubes communicating through the inner walls and the casing, and adapted to exhaust the gases to atmosphere after they pass through the turbine blading. The exhaust tubes additionally function to preheat the incoming gases, thereby achieving economy of fuel consumption.

With such a construction, a part of the air will pass directly from the compressor in the casing to the rear of the unit without being subject to the initial combustion. As a consequence, in addition to the power delivered from the turbine, a supplemental thrust will be achieved through a ram action. Desirably, afterburners are provided which effect a secondary combustion before the ram air is exhausted to atmosphere, with the result that appreciably greater thrust is available from the unit, particularly in higher velocity ranges.

A better understanding of the present invention will be had by reference to the drawing, illustratively setting forth a preferred embodiment, and in which is shown a cutaway perspective view of this gas turbine type of thermal jet engine.

There is generally shown in the drawing an elongated casing 10 including a forward section 12 and a compressor casing 14 coupled together at a joint 16. The compressor casing 14 is in turn coupled to an outer turbine casing 18, as at 20. The remaining portion of the casing 10 forms the rear or tail section 22 of the unit and is joined at 24 to the outer turbine casing 18. It will be appreciated that various casing constructions can be utilized and that the particular casing shown is not critical to the invention.

The tail section 22 terminates in a discharge nozzle 26 of a conventional type suitable for varying the cross sectional area of the rear and opening of the unit, as by a mechanical control linkage or the like, not shown.

Disposed within the forward section 12 of the casing 10 and axially extending therefrom is shown a nose section or fairing 28 having the usual contour and adapted to house required accessories, a starting motor, or the like. The fairing 28 is attached to an annular bearing support 30 by recessed volts 32. The bearing support 30 is concentrically disposed within the forward section 12 and stably held therein by a plurality of radially extending struts 34, which connect between the support 30 and the forward section 12. In addition, inlet guiding vanes 36 also connect between the support 30 and the forward section 12 and are designed for adjustable angular positioning about pins 38 for directing the inlet flow.

A shaft 40 is co-axially disposed within the bearing support 30 and rotatively mounted on a double row of high speed front bearings 42 and a single row rear bearing 44. A retainer 46 is provided adjacent the rear bearing 44 for holding an oil seal 48. To the rear of the bearing 44, the shaft 40 is rigidly coupled to a compressor impeller of a modified centrifugal type, from which extend blades 52 within the compressor casing 14. At its rear end, the shaft 40 terminates in a reduced diameter portion which is secured to a circular backing plate 54. The shaft 40 may be axially retained in position as with lock nut structures 56 connected at its opposing ends, respectively.

The backing plate 54 forms a part of the turbine construction and is further secured for rotation with the compressor impeller 50, as by a retaining ring 58 spaced from and co-axial with the shaft 40. The turbine unit is also designed for radial flow (although conceivably a conventional turbine might be used) and is formed by a plurality of blades 60 disposed around the edge of and extending normally from the backing plate 54. A stationary inner turbine casing 62, in the form of the curved annular wall shown, is positioned around the connecting ring 58 and extends towards the rear of the unit to an axial point approximately aligned with the joint 24, before it is curved radially inwardly to form an inner ducting 64. The inner ducting 64 terminates in a flanged wall section 66. The rearward edges of the turbine blades 60 similarly include a rim member 68 connected thereto and adapted to rotate closely about the stationary wall 66, whereby gases entering through the inner ducting 64 will be confined to radial flow through the turbine blading 60.

In this regard, after the gases pass through the turbine blading 60, they are exhausted through tubes 70 disposed around the inner casing 62 and connecting with openings in the outer turbine casing 18 for discharge of the expanded gases to atmosphere. Preferably, the exhaust tubes 70 are directed through the openings in the outer casing 18 at an acute angle towards the rear of the unit whereby the gases are additive to the thrust available for the engine.

In the rear section 22, in proximity to the joint 24, a plurality of vortex generators or fins 72 are rigidly secured to the inner portion of the casing 10 and are designed to centrally direct the compressed air from the compressor blading 70 to a combustion chamber portion 74 of the tail section 22 of the unit. The combustion chamber 74 is conventionally provided with ignition means, shown schematically in the form of an ignition plug 76. In addition, the usual fuel supply is shown as schematically including a fuel pump 78 connected to a throttle device 80, in turn communicating with a fuel manifold 82 and nozzles 84 disposed in the curved section of the inner turbine casing 62. In a manner similar to the action of the fins 72, the nozzles 84 direct fuel towards a central rearward portion of the unit with the result that an inner confined ball of flame is formed upon combustion.

Desirably, fuel nozzles 86 are also provided within the tail section 22 towards the rear of the unit to create additional ram thrust in a manner which will become clearer as the operation of the unit is described. As shown, the fuel nozzles 86 may be connected in parallel to the throttle device 80 for separate or combined control with the initial burners 84.

In operation, air is taken in around the fairing 28 and passes through the annular space between the bearing support 30 and the forward casing section 12 to be directed and guided by the struts 34 and adjustable vanes 36. Thereafter, the air passes into the blading 52 of the centrifugal compressor. It will be appreciated that although only a single stage compressor is shown, that additional stages might be added according to the particular application requirements.

After the air has been compressed, it passes between the outer turbine casing 18 and the inner turbine casing 62 about the exterior of the exhaust tubes 70 through an annular diffuser area. As this flow action is taking place, the exhaust tubes 70 function as heat exchanger elements, in that the walls of the tubes serve to raise the temperature of the incoming air as a result of the hot exhaust gases passing through the interior of the tubes. Compressed air then is directed by the fins 72 to the central portion of the combustion chamber 74. The fins 72 are so located and shaped that they serve to impart a swirling, vortex type of flow to the air which tends to result in an inner high pressure region prior to combustion and to reverse the axial flow of the resultant gases after fuel has been added from the nozzles 84 and combustion has taken place. As a consequence of such action, the gases will be directed, as shown by the arrows, through the inner ducting 64 towards the backing plate 54. The high temperature, high pressure gases will then radiate outwardly through the turbine blading 60 to drive the turbine and compressor before they are exhausted to atmosphere through the tube 70. The turbine blades 60 are designed to absorb most of the energy of the reverse flow gases, whereby the high pressure region may be maintained in the combustion or energy release area.

It will be evident that not all of the compressed air will be effectively directed or burned upon initial combustion in the chamber 74, but that a relatively high proportion of the pressurized air will continue straight through the tail section 22 of the unit to pass out of the discharge nozzle 26, as further schematically shown by the arrows. This characteristic of the unit results in the important dual flow feature of the jet engine, and is an important aspect of the present invention.

In order to further usefully apply the energy of the high pressurized air passing directly through the unit for thrust purposes, fuel nozzles 86 are desirably employed to cause secondary combustion and raise the temperature of these direct flow or ram gases with a consequent increase in energy available for thrust or propulsion power. It will be apparent that no temperature problem is encountered from a metallurgical standpoint with relation to the ram gases as no turbine blading is involved but merely the sidewalls of the tail section 22, which may be fabricated to adequately withstand temperatures in the range of 4000° Rankine.

Another important feature of the invention resides in the provision of a combustion chamber 74 occupying the entire cross sectional area of the tail section 22, whereby no inner confining walls or bends are present to cause frictional losses or an undesirable pressure drop. As a consequence, test data indicates that substantially no pressure loss results from the time the gases leave the compressor blading 52 until they are directed to the turbine blading 60. Thus, the design embodied in the jet engine of the present invention effectively incorporates the advantages of both its straight-through and return flow type of combustion chambers now alternatively used in convetnional jet engine designs.

It is also seen from the foregoing description that the design of the unit is such that it may be successfully applied to a wide range of velocity requirements. In effect, the unit thus also combines important features of the ram jet as well as the conventional gas turbine type of jet engine. Towards this end, the discharge nozzle may be fully opened at higher velocities, whereby a maximum amount of ram air and combusted gases will pass directly through the unit to impart a considerable portion of the total thrust available at high speeds. Thus, at high speeds the gases being directed through the inner ducting to drive the turbine blades 60 will be used to a great extent as a means of driving the compressor impeller 50. It will also be seen, as previously mentioned, that the gases exhausted through the tubes 70 towards the rear of the unit will also provide a supplemental thrust action. At lower speeds, particularly in the range of cruising speeds for light aircraft, the discharge nozzle may be operated to effect a decreased exhaust area with the consequence that the greater proportion of the gases will be burned in initial combustion in the chamber 74 and directed into the turbine blading 60. As a result, the turbine power will be increased to in turn increase the compression ratio and compensate for the decrease in thrust not available from ram flow at lower velocities. In contrast, with the closing of the exhaust nozzle in the conventional engine, the pressure differential across the turbine is reduced and necessary thrust is not available in lower velocity ranges.

While the design of the present unit effects the above advantages, the construction is still such that no increase in the weight to power ratio is required nor an overall increase in the dimensions of the unit. On the contrary, by embodying the radial flow type of turbine, a considerable savings in the length of the unit may be realized relative to jet engines of this type presently available. It is also evident that in employing the vortex generators or fins 72 as a means of reversing the flow of the air instead of bends or comparable inner walls, an additional savings in the overall dimensions of the unit is accomplished while still achieving the advantages of the return-flow type of combustion chamber in separating the turbine blading from the high temperature radiation of combustion.

Although generally a preferred embodiment of the jet engine of the present invention has been shown and described, it will be appreciated that many changes and modifications may be made without departing from the spirit or scope of the invention. In addition, of course, many details of construction and accessories that might be employed have not been discussed or shown since they are well known in the art. Therefore, the invention should not be thought of as limited to the particular structure shown but rather as embodied in the following claims.

What is claimed is:

1. In a gas turbine type of thermal jet engine, the combination including: a shaft; a compressor coupled to said shaft; a turbine coupled to said shaft to the rear of said compressor; a casing disposed about said compressor and turbine, said casing including a tail section to the rear of said turbine; inner wall means enclosing said turbine and adapted to guide pressurized air from said compressor about the exterior of said turbine to a combustion area within said tail section; means for introducing fuel into said combustion area; guiding means disposed within said tail section designed to converge the flow of said pressurized air inwardly into said combustion area in a vortex action reversing the direction of flow thereof, whereby upon combustion the resultant gases will be directed through said turbine; said inner wall means including a portion to guide said resultant gases into said turbine; and exhaust tubing communicating from said turbine through said inner wall means to the exterior of said casing.

2. The subject matter according to claim 1, in which said guiding means comprises a plurality of angulated fins disposed about the inner periphery of said tail section in axial proximity to said compressor.

3. The subject matter according to claim 1, in which said inner wall means is folded back on itself adjacent said combustion area to form an inner ducting adapted to guide said resultant gases to said turbine.

4. The subject matter according to claim 1, in which said inner wall means are formed in such a manner as to direct another part of said pressurized air directly through said tail section, whereby a bi-flow results.

5. The subject matter according to claim 4, in which additional means for introducing fuel are provided to the rear of said combustion area whereby secondary combustion may be effected with respect to said another part of said pressurized air.

6. The subject matter according to claim 5, in which an exhaust nozzle is provided at the end of said tail section, said exhaust nozzle being constructed to vary the cross sectional area for exhaust gases passing therethrough.

7. In a gas turbine type of thermal jet engine: a shaft; a compressor coupled to said shaft; a turbine coupled to said shaft to the rear of said compressor; a casing disposed about said compressor and turbine, said casing defining a combustion area to the rear of said turbine; means for introducing fuel into said combustion area; inner wall means bypassing said turbine and forming a passage in co-operation with said casing for the flow of pressurized air towards said combustion area from said compressor; and, guiding means within said casing axially interposed between said turbine and said combustion area, said guiding means acting to converge a part of the pressurized air into said combustion area in a vortex action reversing the direction of flow thereof, whereby upon combustion the resultant gases will be directed through said turbine.

8. The subject matter according to claim 7, in which said guiding means directs another part of said pressurized air in a continuing straight-through flow through said casing.

References Cited in the file of this patent

UNITED STATES PATENTS

| | | |
|---|---|---|
| 2,585,626 | Chilton | Feb. 12, 1952 |
| 2,651,175 | Griffith | Sept. 8, 1953 |

FOREIGN PATENTS

| | | |
|---|---|---|
| 666,062 | Great Britain | Feb. 6, 1952 |